(12) United States Patent
Lüchinger et al.

(10) Patent No.: US 7,770,761 B2
(45) Date of Patent: *Aug. 10, 2010

(54) DOSAGE-DISPENSING DEVICE FOR SUBSTANCES IN POWDER OR PASTE FORM

(75) Inventors: Paul Lüchinger, Uster (CH); Siegfried Zeiss, Wolfhausen (CH)

(73) Assignee: Mettler-Toledo AG, Greifensee (CH)

( * ) Notice: Subject to any disclaimer, the term of this patent is extended or adjusted under 35 U.S.C. 154(b) by 216 days.

This patent is subject to a terminal disclaimer.

(21) Appl. No.: 11/885,251

(22) PCT Filed: Oct. 3, 2006

(86) PCT No.: PCT/EP2006/067007
§ 371 (c)(1),
(2), (4) Date: Aug. 29, 2008

(87) PCT Pub. No.: WO2007/039611

PCT Pub. Date: Apr. 12, 2007

(65) Prior Publication Data
US 2008/0190963 A1 Aug. 14, 2008

(30) Foreign Application Priority Data

Oct. 3, 2005 (EP) .................................. 05109150
Oct. 3, 2005 (EP) .................................. 05109151

(51) Int. Cl.
*G01F 11/10* (2006.01)
(52) U.S. Cl. ..................................... 222/344; 222/453
(58) Field of Classification Search ................. 222/344, 222/239, 345–347, 367, 408–414, 411, 365, 222/240, 453, 457, 440, 402.25
See application file for complete search history.

(56) References Cited

U.S. PATENT DOCUMENTS 346,265 A * 7/1886 Charlton et al. ............. 222/241

(Continued)

FOREIGN PATENT DOCUMENTS

DE 198 41 478 A1 3/1999

(Continued)

OTHER PUBLICATIONS

International Search Report, PCT/EP2006/067007, 2007.

(Continued)

*Primary Examiner*—Lien T Ngo
(74) *Attorney, Agent, or Firm*—Buchanan Ingersoll & Rooney PC (57) ABSTRACT

A dosage-dispensing device for substances in powder- or paste form is equipped with a supply container and with a dosage-dispensing head that is connected or connectable to the supply container and has a housing with an outlet orifice of circular cross-section. The dosage-dispensing head further has a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis, so that the delivery- and closure element can be moved out of, as well as into, the outlet orifice. The delivery- and closure element, in its basic configuration is of a cylindrical shape and has a cylindrical closure portion that serves to close off the outlet orifice and, adjacent to the closure portion, a delivery portion that serves to deliver the substance to be dispensed. When the dosage-dispensing device is in its operating state, the delivery portion is located in the lower part of the delivery- and closure element. Said lower part has an end surface that is inclined at an oblique angle relative to a plane that extends orthogonal to the central lengthwise axis, wherein the end surface at its lowest point forms a tip that coincides with a point on the cylindrical surface, and the topmost point likewise coincides with a point on the cylindrical surface.

16 Claims, 3 Drawing Sheets

U.S. PATENT DOCUMENTS

| | | | |
|---|---|---|---|
| 2,084,029 A | 6/1937 | Hochstim | |
| 4,895,274 A * | 1/1990 | Morimoto et al. | 222/63 |
| 4,905,525 A | 3/1990 | Kurfürst | |
| 5,145,009 A | 9/1992 | Mheidle et al. | |
| 6,237,815 B1 * | 5/2001 | Schlosser | 222/241 |
| 2008/0283555 A1 * | 11/2008 | Luechinger et al. | 222/235 |

FOREIGN PATENT DOCUMENTS

| | | | |
|---|---|---|---|
| EP | 0 201 777 A2 | | 11/1986 |
| EP | 0 654 422 A1 | | 5/1995 |
| FR | 2 607 794 A1 | | 6/1988 |
| FR | 2 682 083 A1 | | 4/1993 |
| GB | 701572 A | | 12/1953 |
| GB | 2051752 | * | 1/1981 |
| GB | 2071065 | * | 9/1981 |
| GB | 1 601 568 A | | 10/1981 |
| JP | 60-52724 A | | 3/1985 |
| JP | 63-128909 | * | 6/1988 |

OTHER PUBLICATIONS

European Search Report, EP 0510951, 2006.

European Search Report, EP 05109150, 2006.

* cited by examiner

DOSAGE-DISPENSING DEVICE FOR SUBSTANCES IN POWDER OR PASTE FORM

The invention relates to a dosage-dispensing device for substances in powder- or paste form which has a dosage-dispensing head that can be or is connected to a source- or supply container.

Dosage-dispensing devices of this kind find application particularly for the dispensing of small quantities of, e.g., toxic substances into small target containers with a high degree of precision. Such target containers are frequently set on a balance in order to weigh the quantity of substance delivered out of the dosage-dispensing device, so that the substance can subsequently be further processed as directed.

The substance to be dispensed in doses is held for example in a supply container which has a connection to the dosage-dispensing head. To perform the dosage-dispensing process, the supply container and the dosage-dispensing head together form a unit, the dosage dispensing-device. The opening of the dosage-dispensing device through which the substance to be dispensed is delivered should preferably be small to allow the targeted delivery of the substance into a container with a narrow opening.

Dosage-dispensing devices for dry and/or powdery pourable materials, for example color dye powders, are known from the prior art and are in operation. As an example, a dosage-dispensing device is described in U.S. Pat. No. 5,145,009 A, consisting of a delivery container with a closable outlet at its underside. As a closure device, a conical valve body is used which has a narrowing taper towards the top and is movable vertically downward to open an outlet orifice. In its open position, the valve body rotates, and is equipped with means to advance the material in the direction of the outlet orifice.

The device of the foregoing description is less suitable for the dispensing of pourable material into containers that have openings with a narrow cross-section. The structure of the valve body with the upward-narrowing taper as well as the rotation of the valve body will cause the particles of the pourable material to leave the outlet with a radial, i.e. horizontal velocity component and will therefore cause a scattering of the particles which can reach even beyond a relatively large opening cross-section of a receiving container.

A method and a device for the delivery of a very small sample quantity of a powder or paste, for example for applications in atomic absorption spectroscopy, are disclosed in U.S. Pat. No. 4,905,525 A. In a supply container with an outlet orifice at the end of a form channel, a piston reaches from above into the sample material in the container. A small sample quantity is pushed through the form channel and delivered from the outlet orifice by pressing the piston into the sample material so that the sample material is compacted above the form channel. In a special embodiment the container is configured in the shape of a funnel towards the outlet orifice and the piston is arranged in an oblique position relative to the outlet orifice.

A dosage-dispensing device for viscous, pasty, powdery or granular products is described in DE 198 41 478 A1, with a supply container of a shape which in the operating position of the dosage-dispensing device has a narrowing taper towards the bottom end where the container has an outlet orifice. Wiper tools are attached to a centrally arranged and rotatable hollow shaft. The dosage-dispensing device has a dosage valve with a valve stem that is arranged inside the hollow shaft, is capable of translatory up- and down-movement, and has at its bottom end a conical valve head with an upward-narrowing taper, so that the outgoing quantity of the dispensed material can be regulated and the outlet orifice can be closed off from above. In some of the embodiments described the dosage valve is likewise designed to be rotatable.

A dosage-dispensing device according to DE 198 41 478 A1 or according to U.S. Pat. No. 5,145,009 A is limited in how small the quantity to be delivered out of the container can be. As the outlet orifice is ring-shaped, the minimum width of the ring gap that can be used for dispensing cannot be narrower than the dimension of the smallest unit of a pourable material, for example a grain of powder, and consequently several units of the pourable material can exit simultaneously through the ring gap. There is further a risk that, depending on the consistency of the pourable material, a part of the gap can be clogged up. This can happen in particular if the delivery rate is to be slowed down towards the end of the dosage-dispensing process by reducing the width of the ring gap, because this will lead to a progressively less favorable ratio between the width and circumference length of the ring gap.

The object of the invention is to propose a dosage-dispensing device that allows the smallest substance quantities of powders or pastes to be filled in a controlled manner into a container.

This task is solved through the features of the independent claim 1.

A dosage-dispensing device for substances in powder- or paste form is equipped with a supply container and, connected or connectable to the latter, a dosage-dispensing head comprising a housing with an outlet orifice of circular cross-section. The dosage-dispensing head further comprising a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis so that it can be moved out of, as well as into, the outlet orifice. The delivery- and closure element in its basic configuration is of a cylindrical shape and has an approximately cylindrical closure portion that serves to close off the outlet orifice, and it further has, adjacent to the closure portion, a delivery portion that serves to deliver the substance to be dispensed. When the dosage-dispensing device is in its operating state, the delivery portion is located in the lower part of the delivery- and closure element where the latter has an end surface that is inclined at an angle relative to a plane that extends orthogonal to the central lengthwise axis. At its lowest point, this end surface forms a tip where it coincides with a point of the cylindrical surface, and the topmost point likewise coincides with a point of the cylindrical surface.

The delivery portion of the delivery- and closure element is shaped so that when the delivery portion of the delivery- and closure element is positioned in the outlet orifice, an effective outlet orifice, i.e., a passage opening, is left free which is arranged off-center and has a non-concentric configuration.

As the delivery portion of the delivery- and closure element has an end surface with a one-sided slant relative to the cylindrical surface of the closure portion, the delivery- and closure element, when it is in a partially open position, frees up the passage opening in a non-centric manner. With a translatory displacement of the delivery- and closure element along the central lengthwise axis of the dosage-dispensing device, the passage opening, i.e., the part of the outlet orifice through which the substance to be dispensed leaves the dosage-dispensing device during the dispensing operation, can be made continuously larger or smaller in a defined manner. Besides, the orientation of the passage opening relative to the central lengthwise axis is changed continually by the rotation due to the one-sided arrangement of the delivery surface. This variable outlet orifice or passage opening allows the delivery of larger or smaller substance quantities depending on the requirements. It offers in particular the possibility to deliver substance quantities of the smallest order, for example powder in the microgram range. In a dosage-dispensing process, a large substance quantity can thus be delivered in a first phase with a relatively large passage opening, and as a given target quantity is being approached, the passage opening can be reduced by the translatory movement of the delivery- and closure element in such a way that only a very small flow of substance is delivered and the target quantity can therefore be met with the utmost accuracy. Thus, unless the outlet orifice is completely closed off, the passage opening always has a defined cross-section that is optimized for the substance to be dispensed.

With this concept, the end surface which forms a delivery surface can be a planar surface, or it can have a concave curvature in at least one direction, or it can be concave-curved and at the same time have a spiraling twist about the central lengthwise axis. All of the aforementioned variants of a delivery surface in the delivery portion of the delivery- and closure element allow for the continuous adjustability of the passage opening in such a way that the latter can be adjusted for the delivery of substances in powder- or paste form in quantities of the smallest order.

Accordingly, the delivery- and closure element of the dosage-dispensing device is configured in its delivery portion to converge to a point that is located out to the side, i.e. on the circumference surface of the cylinder. In comparison to the delivery- and closure elements with a rotationally symmetric tip arranged on the central lengthwise axis as known, e.g., from the prior art, the tip with the one-sided slanted surface area as proposed here is distinguished in that with a translatory movement of the delivery- and closure element into and out of the outlet orifice the remaining passage opening is not a ring-shaped gap which would impose a lower limit on the minimally deliverable substance quantities.

A variation of the delivery portion is possible relative to the angle of inclination of the end surface that forms the delivery surface, i.e. the angle that has its apex at the lowest point of the end surface and is enclosed by a line on the cylindrical surface that runs parallel to the central lengthwise axis and a line that runs along the slanted end surface to the topmost point of the end surface.

Besides, the rotation of the delivery- and closure element also generates and maintains the flow movement of the substance to be delivered. With the different configurations of the delivery surfaces of the delivery- and closure element, it is possible among other things to control the flow of the substance to be delivered. The passage opening, in particular the cross-sectional area of the latter, can thus be optimized for the given factors of the material to be dispensed.

In a particularly preferred further developed embodiment, the dosage-dispensing device includes a conveying tool which is likewise configured to be rotatable about the central lengthwise axis. By means of the conveying tool, substance that is to be dispensed is moved towards the outlet orifice and substance that clings to the rim of the outlet orifice is released from the latter. Thus, no substance remains in the outlet orifice. This eliminates the possibility of substance getting caught in the outlet orifice whereby a complete closure would be made impossible when the outlet orifice is to be completely closed at the end of the dispensing process. The conveying tool also makes it possible to dispense strongly coagulating powders such as powders containing charged particles, or to dispense pastes, in that the conveying tool loosens these substances, moves them to the outlet orifice, and wipes them off the rim of the outlet orifice.

The conveying tool can also be pushed against the rim of the outlet orifice by means of a spring force. In a preferred design, the conveying tool has a stirrer part and a conveying element, wherein the conveying element in an advantageous design has a portion with an extensive smooth surface and, when in operation, the conveying element is always in loose contact with the rim of the outlet orifice. In a specific configuration, the conveying element has a tip which is in contact with the rim of the outlet orifice during operation.

With preference, the conveying element is positioned at an acute angle relative to the tangential direction of the circular path traveled by the conveying element in its rotation about the central lengthwise axis, and/or the conveying element is slanted at an acute angle relative to the central lengthwise axis.

In a specific embodiment, the delivery- and closure element is connected to a rod which is arranged along the central lengthwise axis and which traverses the supply container as a driving shaft, and the conveying tool is constrained in relation to the rod and the delivery- and closure element in such a way that the conveying tool is capable of translatory displacement along the central lengthwise axis.

In a particularly preferred further developed version, the dosage-dispensing head of the dosage-dispensing device and/or the dosage-dispensing device itself has a housing that is narrowed down towards the outlet orifice.

The dosage-dispensing device is hereinafter described through examples that are represented schematically in the drawings, wherein:

FIG. 6b shows the delivery- and closure element of FIG. 6a, but rotated by 90° in relation to the view of FIG. 6a;

FIG. 7b shows the delivery- and closure element of FIG. 7a, but rotated by 90° in relation to the view of FIG. 7a.

Figure 1:
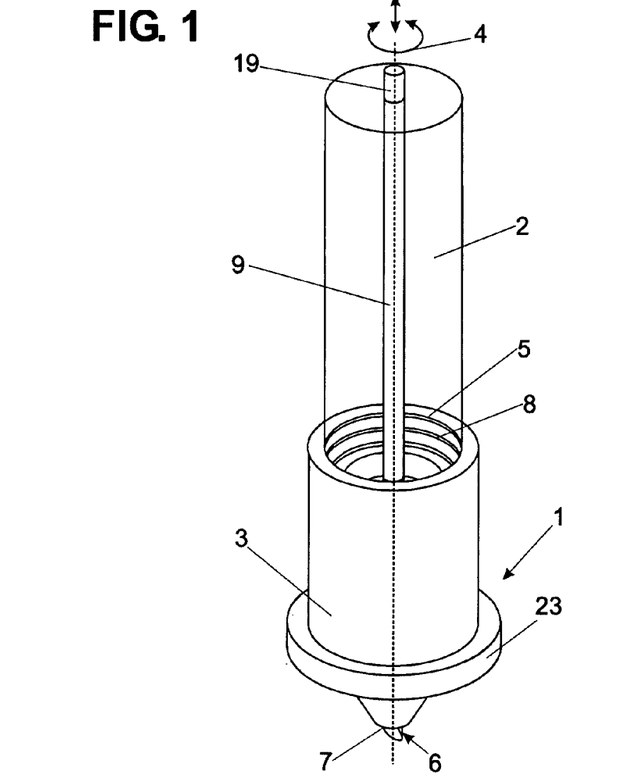
FIG. 1 illustrates in a three-dimensional drawing a dosage-dispensing device with a dosage-dispensing head screwed on to a supply container.

FIG. 1 shows a dosage-dispensing device for substances in powder- or paste form which includes a dosage-dispensing head 1 and a supply container 2. The dosage-dispensing device has in essence an axially symmetric configuration. In its operating position, for example in a dosage-dispensing process, it is oriented with its central lengthwise axis 4 directed vertically. In the arrangement of FIG. 1, the dosage-dispensing head 1 which has a housing 3 is located below the supply container 2. It is joined to the supply container 2, and prior to filling the supply container, the dosage-dispensing head is screwed onto the supply container by means of an internal screw thread 5 of the dosage-dispensing head 1 and an external screw thread 8 of the supply container 2. In principle, the dosage-dispensing head can be releasably connected to the supply container through any state-of-the-art connection, or it can also have a fixed connection to the supply container. However, to facilitate cleaning, a dosage-dispensing head 1 that can be set or screwed onto the supply container 2 is preferable.

The housing 3 has a projecting ledge 23 which serves for example to fasten the dosage-dispensing device in a holder that is not shown here. The housing 3 is narrowed down towards the outlet orifice 7 in order to improve the way in which the substance to be dispensed is directed towards the outlet orifice 7. However, although this narrowed-down shape is, preferred, it is not an absolute requirement.

A rod 9 that is connected to a delivery- and closure element 6 and forms a drive shaft passes through the supply container 2 and, as shown in FIG. 1, has one end protruding from the supply container 2. At the protruding end, the rod 9 has a coupling area 19 for a drive source which is not shown here and which may be a manual or motorized drive mechanism.

Figure 2A:
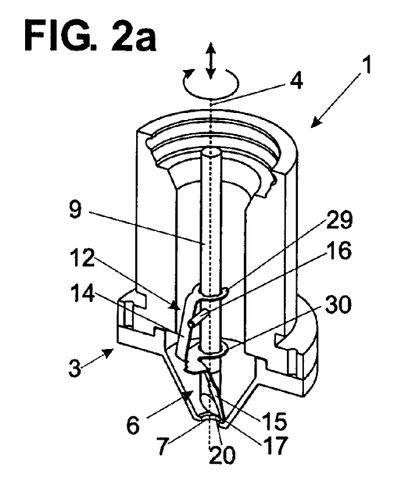
FIG. 2a illustrates in a three-dimensional drawing a dosage-dispensing head with a first embodiment of the delivery- and closure element in the open position, with the housing of the dosage-dispensing head cut open in the lengthwise direction.

FIG. 2a shows a dosage-dispensing head 1 with a first embodiment of a delivery- and closure element 6 in a three-dimensional representation, wherein the housing 3 of the dosage-dispensing head is cut open lengthwise. The dosage-dispensing head 1 is shown in FIG. 2a with the outlet orifice in the open condition. The delivery- and closure element 6 in its basic configuration has a cylindrical shape and is rigidly connected to the rod 9 which extends along the central lengthwise axis 4 of the dosage-dispensing head 1 or of the dosage-dispensing device. The rod 9, and thus the delivery- and closure element 6 is configured to be rotatable about the central lengthwise axis 4 as well as capable of translatory movement along the latter. The rod 9 in this arrangement is preferably driven by a motor.

It is considered self-evident that the delivery- and closure element 6 can also be of one piece together with the rod 9.

Figure 2B:
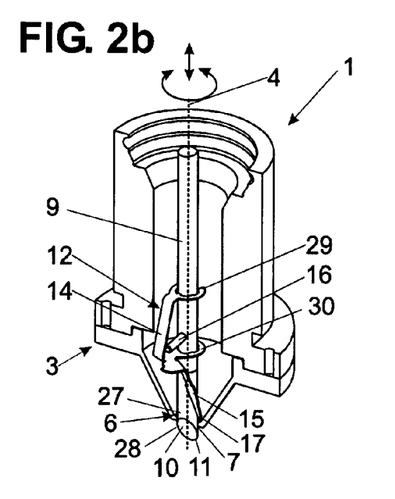
FIG. 2b illustrates in a three-dimensional drawing a dosage-dispensing head with a first embodiment of the delivery- and closure element in the closed position, with the housing of the dosage-dispensing head cut open in the lengthwise direction.

FIG. 2b shows the dosage-dispensing head in an analogous representation as FIG. 2a, with the difference that the outlet orifice 7 in FIG. 2b is completely closed off by the delivery- and closure element 6. The opening and closing of the outlet orifice 7 takes place by moving the delivery- and closure element 6 along the central lengthwise axis 4, i.e. vertically in the arrangement of FIGS. 2a and 2b.

Figure 3A:
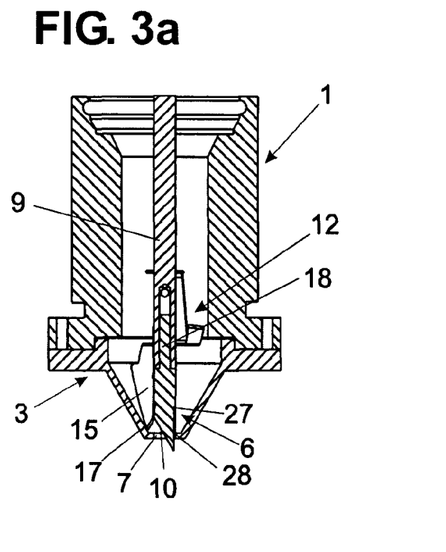
FIG. 3a represents a sectional view of the dosage-dispensing head of FIG. 2a with the delivery- and closure element in the open position.

The delivery- and closure element 6 has a closure portion 27, which is configured cylindrically and which in the closed position (see FIG. 2b) closes the outlet orifice 7 with an exact fit. When a dosage-dispensing activity is in progress, the outlet orifice 7 is either completely open as shown in FIG. 2a or at least partially open as shown in FIG. 3a and thereby forms a passage opening which corresponds to an effective outlet orifice. In the at least partially opened condition, a delivery portion 28 of the delivery- and closure element 6 which is arranged adjacent to the closure portion 27 and serves for the delivery of substance to be dispensed reaches into the outlet orifice 7.

The delivery portion 28 which, in the operative condition of the dosage-dispensing device, is located in the bottom part of the delivery- and closure element 6 has an end surface which is set an oblique angle relative to a plane that extends orthogonal to the central lengthwise axis 4. As a result, a delivery surface 10 is formed, which in the embodiment of FIGS. 2a and 2b narrows into a tip 11 at its lowest point which coincides with a point of the cylinder surface, while its topmost point coincides likewise with a point of the cylinder surface.

The delivery surface 10 in the representation shown here is drawn as a planar surface. However, the delivery surface 10 can also be configured as a surface that is inward-curved in one or in two dimensions, i.e., in two mutually orthogonal directions. In other words, it can be configured as a concave surface. Furthermore, a delivery surface is conceivable with a concave curvature in one arbitrary direction or in two directions that are not orthogonal to each other, i.e. arbitrary directions (see for example FIGS. 7a to 7c).

For the dispensing, i.e. with the outlet orifice 7 in its open position, the delivery- and closure element 6 is either retracted completely from the outlet orifice 7, which is the case in the completely open position, or the delivery portion 28 of the delivery- and closure element 6, i.e. the area that includes the delivery surface 10, reaches in part into the outlet orifice 7 and leaves a passage opening for the passage of the substance to be dispensed. However, in order to completely close off the outlet orifice 7, a part of the delivery- and closure element 6 that lies outside the area with the delivery surface 10, namely the closure portion 27, needs to reach into the outlet orifice 7. The latter has a diameter equal to the diameter of the delivery- and closure element 6 in the closure portion 27, so that the delivery- and closure element 6 can be moved into and out of the outlet orifice 7 with a precise fit whereby the outlet orifice 7 can be completely closed. If the delivery- and closure element 6 is moved so that its delivery portion 28 reaches into the outlet orifice 7, the latter is made smaller in comparison to the completely open position. This allows a targeted control of the delivery of substances in powder- or paste form, as the delivery portion of the delivery- and closure element 6 reaches at any moment more or less deeply into the outlet orifice 7 and thereby forms a passage opening of variable size. For powder of a fine grain size and a loose-flowing consistency, the dosage-dispensing head 1 of the foregoing description can achieve a volume flow that allows doses in the microgram range to be dispensed. The preferred means for measuring the delivered substance quantity is a balance, which is not shown in the drawing as it is not a subject of the invention.

For the dispensing of pulverous substances with poor pouring properties, i.e. for example cloggy powders, or for the dispensing of pasty substances there is a conveying tool 12 arranged inside the dosage-dispensing head 1. The conveying tool 12 has a holding device with ring-shaped holders embracing the rod 9 in two positions above each other, whereby the conveying tool 12 is loosely connected to the rod 9. The conveying tool 12 further has a stirrer part 14 and a conveying element 15. The upper ring-shaped holder 29 of the conveying tool 12 which is shown in FIGS. 2a and 2b is arranged above a transverse bolt 16 that is solidly connected to the rod 9, while the lower ring-shaped holder 30 is arranged below the transverse bolt 16. With this arrangement, the conveying tool 12 is guided and constrained in the dosage-dispensing device. With a translatory movement of the rod 9 along the central lengthwise axis 4, i.e., when the outlet orifice 7 is opened or closed, the loose attachment of the conveying tool 12 to the rod 9 ensures that, due to the force of gravity, the conveying tool 12 always remains in loose contact with the rim 20 of the housing 3 which surrounds the outlet orifice and is hereinafter referred to as the rim of the outlet orifice 7. Furthermore, as the rod 9 rotates, the transverse bolt 16 is brought into contact with the stirrer part 14 and pushes the conveying tool 12 to participate in the rotation.

The stirrer part 14 serves to loosen the substance to be dispensed during the time that the substance is in the area of the dosage-dispensing head 1.

As already mentioned, the conveying element 15 remains in contact with the rim of the outlet orifice 7 also when the delivery- and closure element 6 is in the open position, so that with the rotation of the delivery- and closure element 6, the substance to be dispensed is conveyed to the outlet orifice and if particles remain clinging to the outlet orifice 7 they are released and the dosage material is delivered. The conveying element 15 preferably includes a surface area that narrows into a tip 17 facing towards the rim of the outlet orifice 7, wherein the tip 17 is in loose contact with the rim of the outlet orifice 7. The conveying element 15, more specifically the aforementioned surface area, has a preferably rounded or curved shape, so that it can act like a shovel to take along strongly coagulated powder and direct it to the outlet orifice 7.

Due to the rotation of the conveying tool 12 about the central lengthwise axis 4, the conveying element moves in a circle. It has proven to be advantageous if the conveying element 15 is positioned at an acute angle relative to the tangential direction of the circular path traveled by the conveying element 15 in its rotation about the central lengthwise axis 4, and/or the conveying element 15 is slanted at an acute angle relative to the central lengthwise axis 4. The angular position of the conveying element is adapted in particular to the consistency of the substance to be dispensed. The shape and orientation of the conveying tool 12 determines the sense of rotation of the delivery- and closure element 6 and thus of the conveying tool 12 for the embodiment of the dosage-dispensing device shown in FIGS. 2a and 2b. The rotation in the illustrated case is clockwise.

As already mentioned above, the conveying tool 12 is held or guided on the rod 9 in such a way that on the one hand the conveying tool 12 participates in the rotation of the rod 9 but on the other hand keeps its position when the rod 9 is displaced along the central lengthwise axis, which means that the conveying element 15, particularly the tip 17 of the conveying element, always remains in loose contact with the rim of the outlet orifice 7, and that in the dispensing process the conveying element 15 directs the powder towards the rim, pushes the powder downward, and wipes it off the rim. This is illustrated in FIGS. 3a and 3b which show a sectional drawing of the dosage-dispensing head.

Figure 3B:
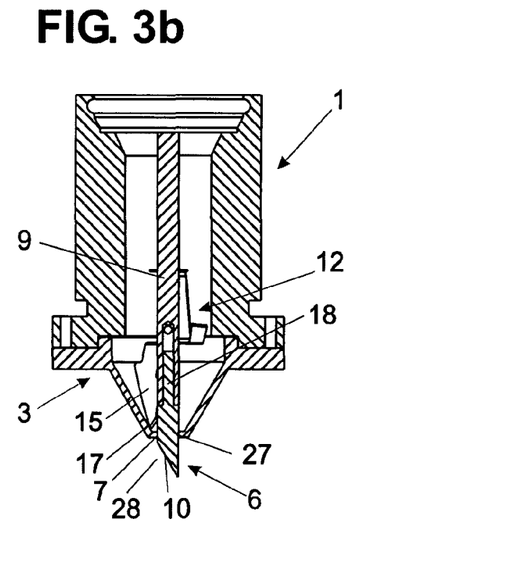
FIG. 3b represents a sectional view of the dosage-dispensing head of FIG. 2b with the delivery- and closure element shown in the closed position.

With the form of representation that was chosen for FIGS. 3a and 3b it is also possible to see how the delivery- and closure element 6 is connected to the rod 9. A bolt 18 of a smaller diameter than the diameter of the delivery- and closure element 6 is inserted in the rod 9 and is for example screwed, glued, soldered, or otherwise fixedly connected to the latter.

Figure 4:
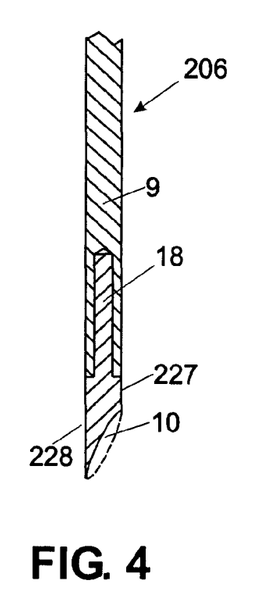
FIG. 4 shows a sectional view of the delivery- and closure element with the rod in a second embodiment.

A second version of a delivery- and closure element 206 is shown in FIG. 4 in a sectional view. The delivery- and closure element 206 is connected by means of a bolt 18, in particular a screw bolt, to the rod 9. The delivery surface 210, which is formed by the inclined end surface of the delivery- and closure element 206, has a concave curvature. A concave curvature of the surface 210 has the effect that with the rotation of the delivery- and closure element 206 the substance to be delivered is taken along and delivered in a controlled manner by the delivery surface 210. This is of particular advantage in the case of coagulating substances which with a delivery surface 210 without curvature could possibly get stuck between the rim of the outlet orifice 7 and the delivery surface, whereby the outlet orifice could become clogged up.

Figure 5:
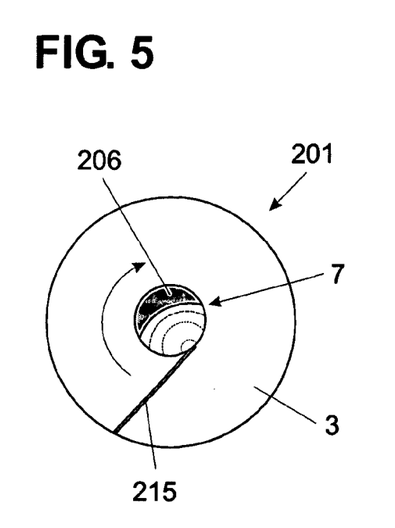
FIG. 5 schematically illustrates a dosage-dispensing head with a delivery- and closure element in a second embodiment as seen from above, with the area of the outlet orifice shown in cross-section.

FIG. 5 schematically illustrates the dosage-dispensing head 201 as seen from above, wherein the delivery- and closure element 206 in the area of the outlet orifice 7 is shown in cross-section. The different outline shapes of the passage opening are indicated for different positions of the delivery- and closure element. Of the conveying tool, one conveying element 215 can be seen in FIG. 5, shown here for the sake of simplicity in profile view from above as a flat sheet metal part delimited by planar surfaces, where the conveying element 215 is set at an acute angle relative to the radius of its circular path and tangentially touches the rim of the outlet orifice 7, so that with a rotation of the delivery- and closure element 206 in the sense indicated by the arrow the substance to be dispensed is directed to the passage opening.

As already mentioned above, a conveying element can also be positioned at an acute angle relative to the tangential direction of the circular path traveled by the conveying element in its rotation about the central lengthwise axis 4, and/or the conveying element can be slanted at an acute angle relative to the central lengthwise axis 4. These angles can be varied depending on the substance to be dispensed, for example by exchanging the conveying tool in the dosage-dispensing device.

The outlet orifice 7 is partially closed by the delivery- and closure element 206 (upper left-hand portion of the orifice 7 in the drawing). The free area constitutes the passage opening. Further positions of the delivery- and closure element 206 by which a passage opening is delimited are indicated by a series of broken lines progressing from the upper left to the lower right of the passage opening shown in the drawing. It is considered self-evident that the broken lines are only representative examples for a continuous variation of the passage opening.

Figure 6A:
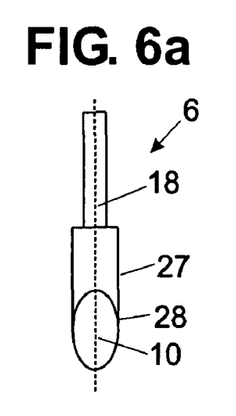
FIG. 6a shows a delivery- and closure element of the first embodiment seen from the side with the view directed at the delivery surface.
Figure 6B:
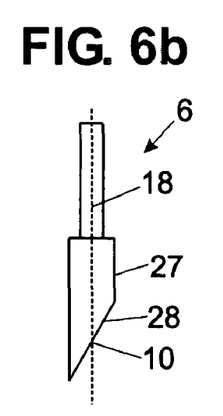
Figure 6C:
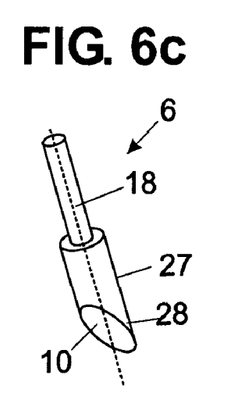
FIG. 6c shows the delivery- and closure element of FIG. 6a in a three-dimensional view.

FIGS. 6a to 6c show the delivery- and closure element 6 of FIGS. 2a and 2b in different views. The illustration includes the delivery- and closure element 6 with the bolt 18 for the attachment to the rod 9. FIG. 6a shows the delivery- and closure element 6 from the side with a view at the delivery surface 10, FIG. 6b shows the same in a position that is rotated by 90° relative to the representation of FIG. 6a, and FIG. 6c shows the delivery- and closure element 6 in a three-dimensional view.

Figure 7A:
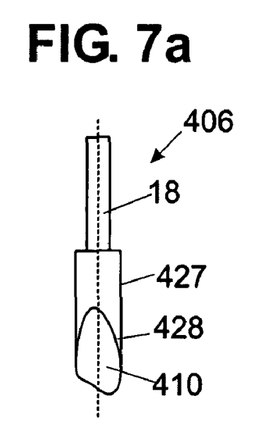
FIG. 7a shows a third embodiment of a delivery- and closure element seen from the side with the view directed at the delivery surface.
Figure 7B:
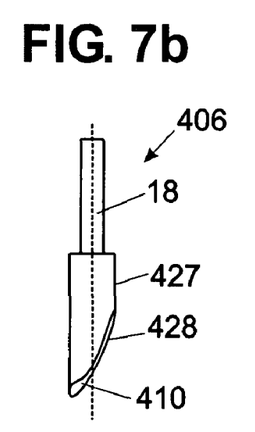
Figure 7C:
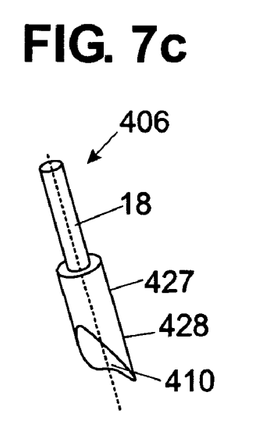
FIG. 7c shows the delivery- and closure element in a three-dimensional view.

FIGS. 7a to 7c show a third configuration of a delivery- and closure element 406 with a tip that is likewise arranged out to the side on the circumference of the cylinder, wherein the delivery portion 428 has a delivery surface 410 that is concave-shaped in two directions and has a slight twist about the central lengthwise axis. This configuration of the delivery surface 410 has the advantage that it guides the substance to be dispensed to the outlet orifice 7. The delivery- and closure element 406 in FIGS. 7a to 7c is shown in different views. In FIG. 7a it is seen from the side with a view of the delivery surface 410, while FIG. 7b shows the same in a 90°-rotated position, and FIG. 7c shows a three-dimensional view.

Variants of the housing of the dosage-dispensing head as well as different embodiments of the drive mechanism are conceivable. The conveying tool, likewise, can be configured in different ways, for example in the form of an elastic arm that is preferably equipped with a helix spring and made of wire or a plastic material. In principle, the conveying tool can also have its own drive mechanism and its translatory as well as rotational mobility can be independent of the delivery- and closure element.

The rod with the delivery and closure element in a further embodiment can be tension-biased in the translatory direction so that when the drive mechanism is uncoupled, the outlet orifice is automatically closed.

LIST OF REFERENCE SYMBOLS 1, 201 dosage-dispensing head
  2 supply container
  3 housing
  4 central lengthwise axis
  5 internal screw thread
6, 206, 406 delivery- and closure element
  7 outlet orifice
  8 external screw thread
  9 rod
10, 210, 410 delivery surface
  11 tip of the delivery- and closure element
  12 conveying tool
  14 stirrer part
15, 215 conveying element
  16 transverse bolt
  17 tip of the conveying element
  18 bolt
  19 coupling area
  20 rim
  23 projecting ledge
27, 227, 427 closure portion
28, 228, 428 delivery portion
  29 upper ring-shaped holder
  30 lower ring-shaped holder

The invention claimed is:

1. Dosage-dispensing device for substances in powder- or paste form with a supply container and with a dosage-dispensing head that is connected or connectable to the supply container, said dosage-dispensing head comprising a housing with an outlet orifice of circular cross-section and a delivery- and closure element, wherein the outlet orifice and the delivery- and closure element are arranged on the central lengthwise axis of the dosage-dispensing head, and the delivery- and closure element is rotatable about the central lengthwise axis in relation to the housing and translatable along the central lengthwise axis so that the delivery- and closure element is moveable at least partially out of, as well as into, the outlet orifice, wherein the delivery- and closure element in its basic configuration is of a cylindrical shape defining a cylindrical surface and has a cylindrical closure portion that serves to close off the outlet orifice and, adjacent to the closure portion, a delivery portion that serves to deliver the substance to be dispensed, wherein when the dosage-dispensing device is in its operating state, the delivery portion is located in the lower part of the delivery- and closure element, said lower part having an end surface that is inclined at an oblique angle relative to a plane that extends orthogonal to the central lengthwise axis, wherein said end surface at its lowest point forms a tip that coincides with a point of the cylindrical surface, and the topmost point likewise coincides with a point of the cylindrical surface.

2. Dosage-dispensing device according to claim 1, wherein said end surface is a planar surface, forming a delivery surface for delivering the material to be dispensed.

3. Dosage-dispensing device according to claim 1, wherein said end surface is shaped with a concave curvature in one or in two directions, forming a delivery surface for delivering the material to be dispensed.

4. Dosage-dispensing device according to claim 3, wherein the delivery surface is shaped with a twist about the central lengthwise axis.

5. Dosage-dispensing device according to claim 1, wherein said end surface is variable relative to the magnitude of the angle which has its apex at the lowest point of the end surface and is enclosed by a line on the cylindrical surface that runs parallel to the central lengthwise axis and a line that runs along the slanted end surface to the topmost point of the end surface.

6. Dosage-dispensing device according to claim 1, wherein the delivery- and closure element is connected to a rod that is arranged along the central longwise axis and traverses the supply container as a drive shaft.

7. Dosage-dispensing device according to claim 1, wherein a conveying tool is provided, serving to convey material that is to be dispensed, which conveying tool is configured to be rotatable about the central lengthwise axis and is supported in a way that allows translatory movement of the conveying tool relative to the delivery- and closure element along the central lengthwise axis.

8. Dosage-dispensing device according to claim 7, wherein the conveying tool is supported and/or guided on the rod with translatory mobility relative to the rod along the central lengthwise axis.

9. Dosage-dispensing device according to claim 7, wherein the conveying tool comprises a stirrer element and a conveying element, wherein when the dosage-dispensing device is in operation, the conveying element is always in loose contact with the delivery orifice.

10. Dosage-dispensing device according to claim 1, wherein the housing is narrowed down in the direction towards the outlet orifice.

11. Dosage-dispensing device according to claim 4, wherein said end surface is variable relative to the magnitude of the angle which has its apex at the lowest point of the end surface and is enclosed by a line on the cylindrical surface that runs parallel to the central lengthwise axis and a line that runs along the slanted end surface to the topmost point of the end surface.

12. Dosage-dispensing device according to claim 5, wherein the delivery- and closure element is connected to a rod that is arranged along the central longwise axis and traverses the supply container as a drive shaft.

13. Dosage-dispensing device according to claim 6, wherein a conveying tool is provided, serving to convey material that is to be dispensed, which conveying tool is configured to be rotatable about the central lengthwise axis and is supported in a way that allows translatory movement of the conveying tool relative to the delivery- and closure element along the central lengthwise axis.

14. Dosage-dispensing device according to claim 8, wherein the conveying tool comprises a stirrer element and a conveying element, wherein when the dosage-dispensing device is in operation, the conveying element is always in loose contact with the delivery orifice.

15. Dosage-dispensing device according to claim 9, wherein the housing is narrowed down in the direction towards the outlet orifice.

16. A dosage-dispensing head connectable to a supply container, comprising:
a housing with an outlet orifice of circular cross-section, and a delivery- and closure element, wherein the outlet orifice and the delivery- and closure element are arranged on the central lengthwise axis of the dosage-dispensing head, and the delivery- and closure element is rotatable about the central lengthwise axis in relation to the housing and translatable along the central lengthwise axis so that the delivery- and closure element is moveable at least partially out of, as well as into, the outlet orifice, wherein the delivery- and closure element in its basic configuration is of a cylindrical shape defining a cylindrical surface and has a cylindrical closure portion that serves to close off the outlet orifice and, adjacent to the closure portion, a delivery portion that serves to deliver a dispensable substance, wherein when the dosage-dispensing device is in its operating state, the delivery portion is located in the lower part of the delivery- and closure element, said lower part having an end surface that is inclined at an oblique angle relative to a plane that extends orthogonal to the central lengthwise axis, wherein said end surface at its lowest point forms a tip that coincides with a point of the cylindrical surface, and the topmost point likewise coincides with a point of the cylindrical surface.

\* \* \* \* \*

UNITED STATES PATENT AND TRADEMARK OFFICE
CERTIFICATE OF CORRECTION

| | |
|---|---|
| PATENT NO. | : 7,770,761 B2 |
| APPLICATION NO. | : 11/885251 |
| DATED | : August 10, 2010 |
| INVENTOR(S) | : Paul Lüchinger et al. |

It is certified that error appears in the above-identified patent and that said Letters Patent is hereby corrected as shown below:

On the Title page of the Letters Patent, under (86)

§ 371 (c)(1), (2), (4) Date: "August 29, 2008" change to --August 29, 2007--.

Signed and Sealed this
Fifth Day of April, 2011

David J. Kappos
*Director of the United States Patent and Trademark Office*